Patented Apr. 14, 1953

2,635,085

UNITED STATES PATENT OFFICE 2,635,085

COMPOSITION FOR PROTECTING ELECTRICAL EQUIPMENT COMPRISING POLYVINYL CHLORIDE, A PITCH, AND A PLASTICIZER

Jean Louis Gonnard, Villeurbanne, and Joseph Edouard Gustave Lahousse, Lyon, France, assignors to Societe des Usines Chimiques Rhone-Poulenc, Paris, France, a corporation of France No Drawing. Application December 8, 1948, Serial No. 64,257. In France December 8, 1947

10 Claims. (Cl. 260—28.5)

This invention relates to the insulation of electrical equipment and to the protection of such equipment from moisture and mould.

The ordinary materials in current use in electrical equipment, in particular radio equipment, though highly satisfactory in dry climates tend to deteriorate very rapidly in countries where the climate is humid and hot, owing to the penetration of moisture and the formation of mould-growth. Insulators, in particular, lose their insulating properties and defects arise in the operation of the apparatus. In order that ordinary materials may, in spite of this fact, be employed in apparatus for use in humid climates, in particular in tropical regions, the materials must be protected from the influence of atmospheric moisture and from attack by micro-organisms.

Normal varnishes, applied to the equipment to be protected by evaporation of solutions of varnishes or synthetic plastic materials, do not give coatings capable of resisting tropical conditions over a long period of time. The moisture quickly penetrates through the coatings which therefore afford ineffective protection.

Varnishes having a basis of phenol-formaldehyde resins or glycerol-phthalic anhydride resins, which are baked after application cannot be regarded as suitable where the articles to be protected comprise substances sensitive to heat, such as cotton or rayon coverings on conductor wires, paper, and the like, owing to the high temperature required for the baking treatment.

According to the present invention a method of insulating elements of electrical equipment and protecting them against the action of moisture or the growth of micro-organisms thereon comprises applying to such elements a layer consisting essentially of—

| | Per cent |
|---|---|
| Polyvinyl chloride | 40 to 50 |
| Pitch | 25 to 35 |
| Plasticiser | 15 to 35 | and thereafter heating the said layer.

The invention further includes as new compositions of matter compositions having the essential ingredients set forth above.

It is known that polyvinyl chloride can be employed for electric insulation and that pitch can be incorporated in polyvinyl chloride in the presence of plasticisers. It has already been proposed to prepare masses by dispersing tricresyl phosphate in molten pitch and incorporating therein polyvinyl chloride and a filler, these masses being homogenised, for example, by passing them through a rolling machine. However, such masses can only be applied by a complicated process of moulding.

Use has also been made, for fashioning articles, of liquid dispersions composed of polyvinyl chloride finely dispersed in a plasticiser which, when cold, is a non-solvent for the polyvinyl chloride, the dispersion being converted by subsequent heating into a solid homogeneous mass. The common plasticisers which, when cold, are non-solvents for the polyvinyl chloride require a temperature of at least 150° C. to dissolve the polyvinyl chloride and complete the homogenisation. Such temperatures are likely to deteriorate heat-sensitive materials. Some plasticisers permit baking at lower temperatures, but these have a slight solvent action even when cold, so that the dispersions in which they are contained harden eventually, even at room temperature, and cannot be stored for any great length of time.

Compositions having the essential composition set forth above, however, may be hardened by heating only to temperatures not exceeding 80° C. and this mild heat treatment does not deleteriously affect heat-sensitive elements to which they are applied. Moreover the heat treatment necessary to harden the compositions of this invention does not cause the compositions to become so fluid that there is any danger of the coating becoming so thin that it drains away from the coated element. Again, the compositions of this invention are relatively stable and show little tendency to harden on keeping, so that they may be stored for long periods.

The coatings obtained are slightly plastic, not brittle and not sticky. They afford excellent insulation and protection against moisture and mould-growth and are not sensitive to shock.

A preferred composition according to the invention consists of—

| | Per cent |
|---|---|
| Polyvinyl chloride | 42 |
| Pitch | 29 |
| Plasticiser | 29 |

The quality of pitch selected will differ according to the hardness which it is desired to impart to the final coating. A soft pitch such as that commonly obtained from gasworks is particularly suitable for the production of coatings which must retain their elasticity even at low temperatures.

The choice of the plasticiser depends, on the one hand, on its own dielectric properties, and on the other hand on its behaviour in the mixture from the viewpoints of exudation and of the fluidity imparted to the mixture. The range of plasticisers which can be employed is very extensive. Excellent results are obtained with chlorinated aromatic hydrocarbons, such as chlorinated diphenyl or chlorinated dibenzyl. Among the esters may be cited the adipates, in particular the methylcyclohexyl adipate. Phosphoric, phthalic and sebacic esters may also be employed.

The mould-resisting properties of the coatings are good, owing to the virtually complete indifference of polyvinyl chloride to micro-organisms. These properties can be further improved by adding fungicides. The choice of fungicide will depend upon its effect on the dielectric properties of the mixture. Fungicides which only slightly reduce the dielectric properties are, for example: phenyl-mercury nitrate, orthophenylphenol, pentachlorophenol, the iron dithiocarbamate, the disulphide of tetramethyl-thiuram and the copper salt of hydroxyquinoline. They can be employed in proportions ranging from 0.1 to 1%.

To prepare the composition, the pitch is dissolved in the plasticiser, which may contain fungicide if required, whereafter the polyvinyl chloride is incorporated in the form of very fine powder, preferably at 35° at the most, while mixing and kneading. This composition can be applied to elements of electrical equipment in various ways. Thus, in one method, it may be spread directly on the element by means of knives, scrapers or other suitable means. It is desirable to pre-heat the element to 60° C. in order to facilitate the coating operation. After the application of a layer from 2 to 3 mm. thick, which is the optimum thickness for a good protection, baking is carried out to convert the layer into a homogeneous coating having a non-sticky surface. This baking is completed in 20 to 30 minutes at 80° C. This method of operation is suitable for elements having an irregular surface.

A second method of application, particularly useful when the element is of simple geometrical form, which consists in covering the element with sheets or strips of material having a basis of a composition of polyvinyl chloride, plasticiser and pitch in accordance with this invention. Such sheets or strips may be obtained by passing the composition, which is obtained in the manner hereinbefore described, through an apparatus comprising heating rolls at about 80° C., for example a three-roll calender, at such a speed that the dispersion of polyvinyl chloride in the plasticiser is only incompletely converted into a homogeneous mass. The sheets obtained are solid, elastic and non-sticky in the cold state, but are sticky when hot. These sheets can be cut into strips and these strips can be wound on themselves, if necessary after a light application of talc to the two surfaces, so as to form coils which can be more readily manipulated. For application to the elements these strips are employed in the same way as lengths of normal insulating tape. The element is covered by winding the strips in overlapping fashion, a slight stretching action being exerted in order to produce a tight grip on the element. It is desirable to pre-heat the element to 50–60° C. by a method which does not cause any condensation of moisture. The baking is then carried out at 80° C., the effect of which is to produce a homogeneous union of the convolutions and to eliminate the stickiness of the outer surface. In cases where the element has cavities, they can be filled in beforehand by means of the first method of application.

A third method of application consists in wrapping round the element strips of textile material coated with the composition. The strips may be prepared by coating narrow lengths or tapes, for example of textile material having a base consisting of polyvinyl chloride or of glass silk, with composition similar to that employed in the first method of application. These tapes may be employed in the same way as the strips of the composition described above with reference to the second method of application.

Protection against moisture in the most severe tropical conditions can be further increased by applying a waterproof varnish to the coating after baking. Varnishes having a base consisting of organo-silicon derivatives are particularly suitable for this purpose. A surface waterproofing can also be obtained by exposure to the vapours of volatile organo-silicon derivatives.

The electrical properties of the coatings obtained are remarkably good. According to the particular composition employed resistivities of the order of $10^{11}$ to $10^{13}$ ohms per square centimetre are obtained. The resistivity is only very slightly lowered in the presence of water or of moisture. Thus, even after standing for 24 hours in water or in a warm, humid atmosphere the resistance does not fall below $10^{11}$ ohms per square centimetre at 20° C.

We claim:

1. An insulating and moisture-proofing composition consisting essentially of polyvinyl chloride from 40 to 50% by weight, soft gasworks pitch from 25 to 35% by weight and plasticiser from 15 to 35% by weight.

2. An insulating and moisture-proofing composition consisting essentially of polyvinyl chloride 42% by weight, soft gasworks pitch 29% by weight, and plasticiser 29% by weight.

3. An insulating and moisture-proofing composition consisting essentially of polyvinyl chloride from 40 to 50% by weight, soft gasworks pitch from 25 to 35% by weight and plasticiser from 15 to 35% by weight, the said composition containing 0.1 to 1% of a fungicide.

4. An insulating and moisture-proofing composition consisting essentially of polyvinyl chloride 42% by weight, soft gasworks pitch 29% by weight and plasticiser 29% by weight, the said composition containing 0.1 to 1% by weight of a fungicide.

5. A non-sticky strip of an insulating and moisture-proofing composition consisting essentially of polyvinyl chloride from 40 to 50% by weight, soft gasworks pitch from 25 to 35% by weight and plasticiser from 15 to 35% by weight, the said strip becoming sticky on heating to 80° C.

6. A non-sticky strip of an insulating and moisture-proofing composition consisting essentially of polyvinyl chloride from 40 to 50% by weight, soft gasworks pitch from 25 to 35% by weight and plasticiser from 15 to 35% by weight, the said composition containing 0.1 to 1% by weight of a fungicide, the said strip becoming sticky on heating to 80° C.

7. A ribbon of textile material impregnated with an insulating and moisture-proofing composition consisting essentially of polyvinyl chloride from 40 to 50% by weight, soft gasworks pitch from 25 to 35% by weight and plasticiser from 15 to 35% by weight, the said ribbon not being sticky when cold but becoming sticky on heating to 80° C.

8. A ribbon of textile material impregnated with an insulating and moisture-proofing composition consisting essentially of polyvinyl chloride from 40 to 50% by weight, soft gasworks pitch from 25 to 35% by weight and plasticiser from 15 to 35% by weight, the said composition containing 0.1 to 1% by weight of a fungicide, the said ribbon not being sticky when cold but becoming sticky on heating to 80° C.

9. Elements of electrical equipment having a protective and insulating coating of an insulating and moisture-proofing composition consisting essentially of polyvinyl chloride from 40 to 50% by weight, soft gasworks pitch from 25 to 35% by weight and plasticiser from 15 to 35% by weight.

10. An insulating and moisture-proofing composition consisting of a dispersion of grains of polyvinyl chloride in a fluid mixture of soft gasworks pitch and a plasticiser, the composition containing 40-50% by weight of polyvinyl chloride, 25-35% by weight of soft gasworks pitch and 15-35% by weight of plasticiser.

JEAN LOUIS GONNARD.
JOSEPH EDOUARD GUSTAVE LAHOUSSE.

References Cited in the file of this patent

UNITED STATES PATENTS

| Number | Name | Date |
|---|---|---|
| 2,093,087 | Lynn | Sept. 14, 1937 |
| 2,312,058 | Youmanns | Feb. 23, 1943 |
| 2,322,903 | Wilkoff | June 29, 1943 |
| 2,370,046 | Keyes | Feb. 20, 1945 |
| 2,413,163 | Bacon | Dec. 24, 1946 |
| 2,461,004 | Soday | Feb. 8, 1949 |
| 2,464,219 | Doyle | Mar. 15, 1949 |
| 2,464,263 | Rudd | Mar. 15, 1949 |
| 2,556,451 | Smith | June 12, 1951 |

FOREIGN PATENTS

| Number | Country | Date |
|---|---|---|
| 602,582 | Great Britain | May 28, 1948 |

OTHER REFERENCES

"Asphalts and Allied Substances," by Abraham, 4th edition, pages 378, 714–715.

Webster's Unabridged Dictionary, 2nd edition, page 1873.